Figure 1:
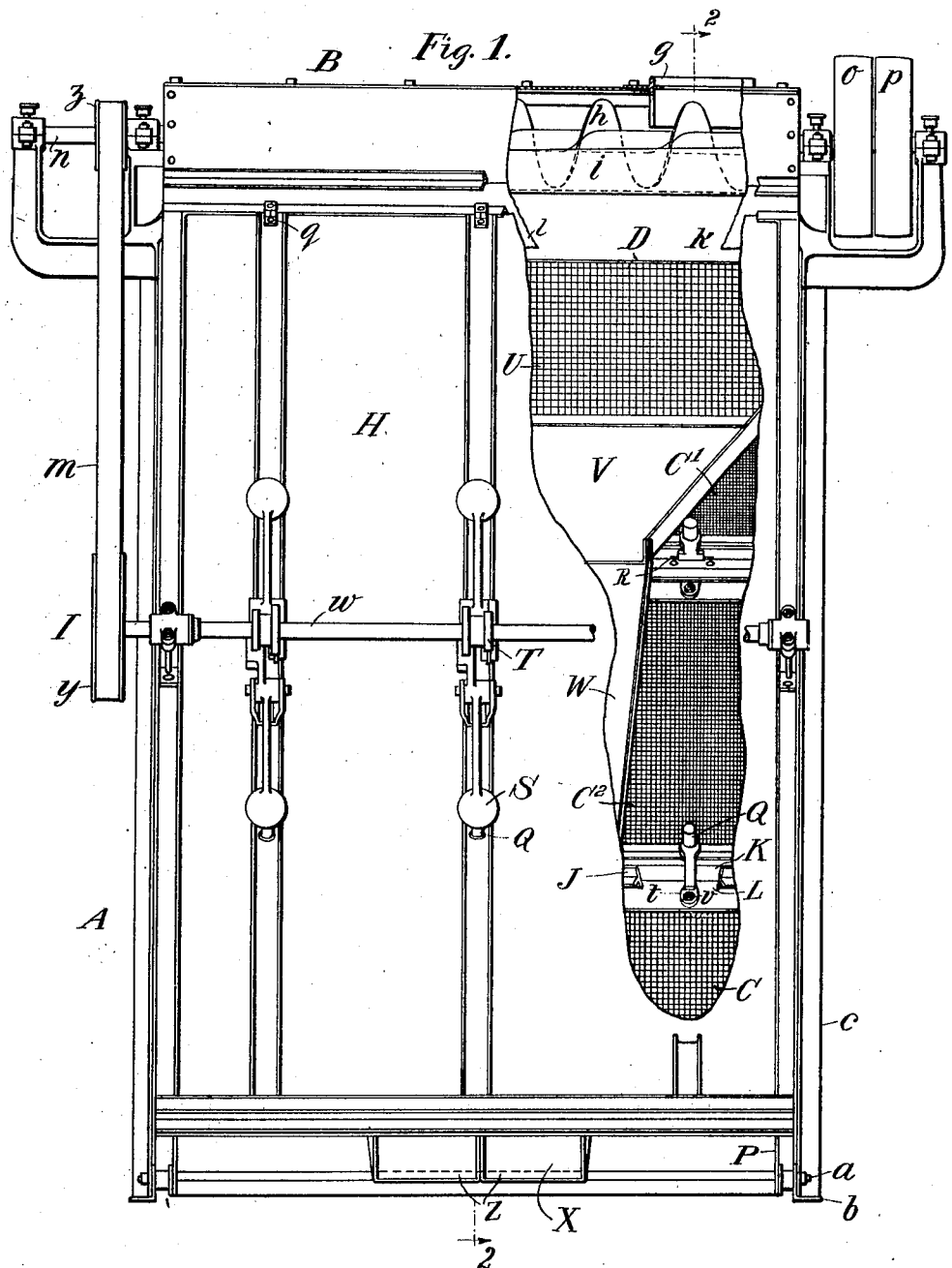

G. H. FRASER.
SCREEN AND OTHER SEPARATOR.
APPLICATION FILED SEPT. 18, 1919. RENEWED AUG. 23, 1922.

1,434,435.

Patented Nov. 7, 1922.
2 SHEETS—SHEET 1.

WITNESSES:
Joseph P. Tighe
James Langley

INVENTOR
George Holt Fraser

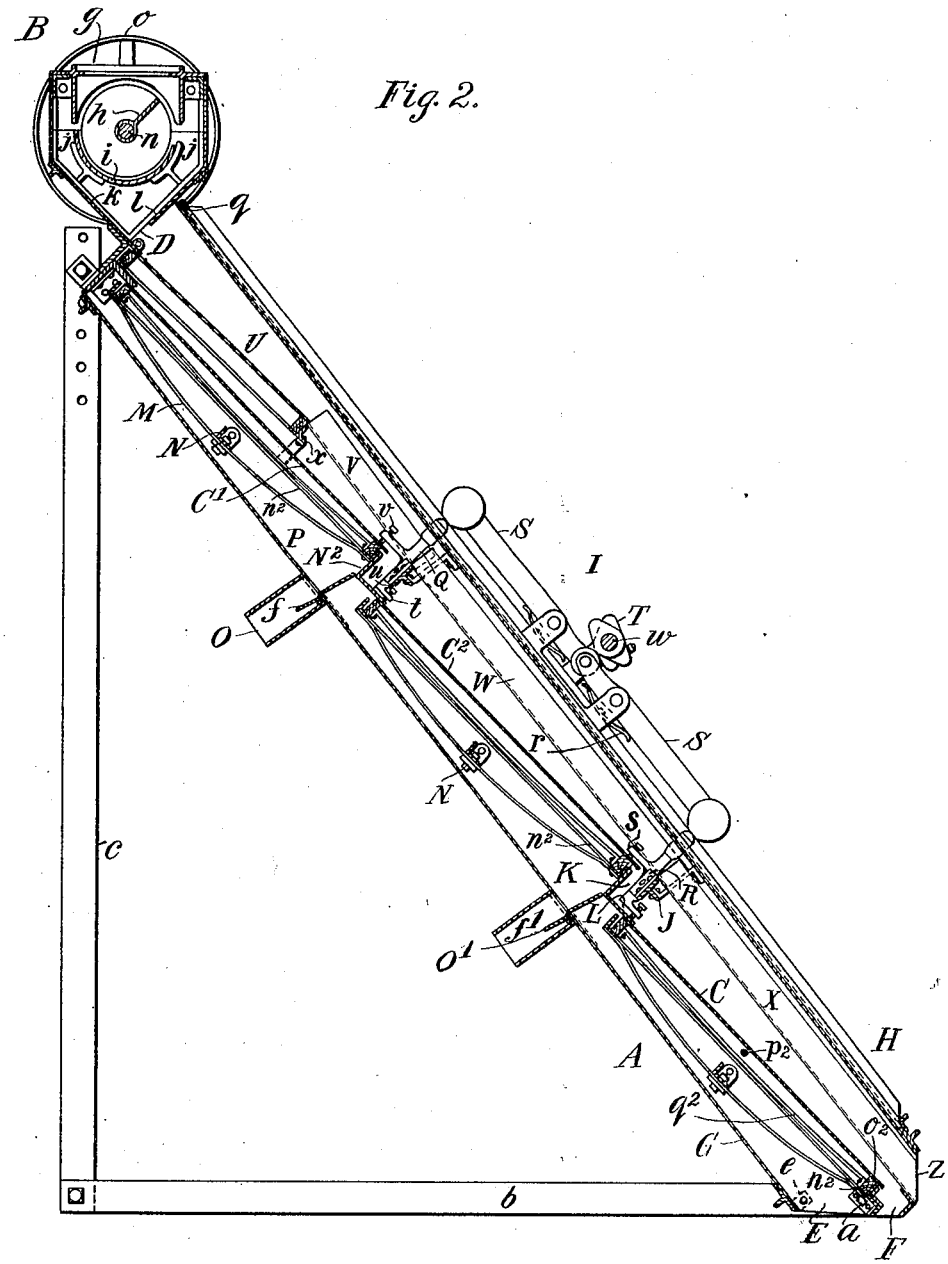

Patented Nov. 7, 1922.

1,434,435

UNITED STATES PATENT OFFICE.

GEORGE HOLT FRASER, OF BROOKLYN, NEW YORK.

SCREEN AND OTHER SEPARATOR.

Application filed September 18, 1919, Serial No. 324,274. Renewed August 23, 1922. Serial No. 583,934.

*To all whom it may concern:*

Be it known that I, GEORGE HOLT FRASER, a citizen of the United States, residing at No. 226 Quincy Street, in the borough of Brooklyn, county of Kings, city and State of New York, have invented certain new and useful Improvements in Screens and Other Separators, of which the following is a specification.

This invention relates to separators of the inclined screen type for separating fine from coarse material, and aims to provide certain improvements therein.

Heretofore separators of this type have been used with a continuous inclined spring-mounted screen onto the top of which material to be screened has been distributed by a conveyor, and the screen has been jarred to prevent clogging. For protecting the fine screen a coarse or guard screen has been provided above it. For varying the inclination of the screen the casing carrying it has been adjusted.

My present invention aims to provide an inclined screen in which ample area can be availed of without too great an acceleration of the speed of flow down the screen; also one in which the inclination of the screen can be varied without adjusting the casing; and also to provide improved scalping provisions for protecting the fine cloth from coarse material, improved jarring mechanism, and various improved features in construction.

To this end in carrying out the preferred form of my present improvements, I provide a plurality of successive screen surfaces disposed one below another, with an intermediate dam or dams for checking the downwardly flowing material, changing its direction and delivering it to the succeeding screen, an improved and relatively short guard screen above the fine screen, improved supporting means for the screens, and I mount the individual screens movably or adjustably, and provide means for varying their inclination independently of the casing, and I provide jarring means acting on two adjacent screens, and means for equally poising the screens relative to the jarring mechanism, and I provide an improved striking or jarring mechanism, an improved beater, and certain other features of improvement, all of which will be more fully hereinafter set forth with reference to the accompanying drawings, in which Fig. 1 is a front elevation of an inclined screen separator partly broken away, showing the preferred form of my invention, and Fig. 2 is a vertical transverse section thereof cut approximately on the line 2—2 of Fig. 1 and looking in the direction of the arrow.

Referring to the drawings, let A indicate the main frame or casing, B the feeder, and C the screens of a separator.

The casing A is shown as hinged by a pin $a$ to feet $b$, and is adjustably supported on legs $c$ at its upper end so that its inclination can be varied. It has a feed inlet D for material on top, a fine outlet E at bottom, and a tailings outlet F in front. It has an inclined back door G hinged at the bottom to a pin $e$ to swing downwardly to give access beneath the screens. The casing has a removable or hinged top or door H, shown as hinged at its upper end so that it can swing upwardly to expose the internal parts.

The feeder B has a hopper $g$ at one end, a distributing conveyor $h$, and a feed trough $i$ having an inclined edge on each side so that the conveyor may force material from the hopper along the trough and discharge it over the edge of the latter in a thin and practically uniform stream throughout the width of the screen, and may discharge over either the rearward or forward edge of the trough as desired. At each side of the trough the feeder has a downwardly extending discharge passage $j$, beneath which at the rear it has a bottom or feed board $k$, and at the front a bottom or feed plate or feed deflector $l$, these being so arranged that discharge from either side of the conveyor will descend to the feed plate, from which it can slide to the screens through the inlet D.

The jarring mechanism I is mounted on the cover H and operated by a belt $m$ from a drive shaft $n$ of the feeder, which is driven from a fixed pulley $o$ beside which is a loose pulley $p$.

As thus far described the parts may be of any usual or suitable construction and arrangement which will ensure feeding the material to the top of the screens and permit it to flow down these in such manner that the fine material can pass through the screens to the fine outlet, and the coarse material flow over the screens to the coarse outlet.

According to one feature of improvement the screen surface is subdivided into a plurality of sections or steps from the top to the bottom, each section being of substantially the same inclination as the next, but each lower section being in a lower plane than the preceding one, and a dam or deflector J is arranged opposite the lower extremity of each section, being spaced therefrom and above the next section sufficiently to leave a deflecting passage K extending preferably at right angles to the screen surface below each screen, and a re-feeding passage L above the top of the next screen, so that the material flowing down a screen will after leaving it strike the dam and be stopped thereby and deflected downwardly and refed to the succeeding screen, its speed of flow being arrested so that it will start over the next screen slowly. The width of the screens is so proportioned that the speed of flow of material will not exceed the desired limit before leaving a screen, and the number of dams and screen sections will be suited to the material or inclination for which the separator is adapted.

Another feature of improvement consists in movably, yieldingly and elastically, and preferably adjustably, mounting each screen section so that this may be vibrated by the jarring mechanism, may yield to adapt themselves to it and to one another, and may be adjusted to change their inclination. Preferably each screen section is independently movable, spring mounted, and adapted to swing or move with or independently of each other section. As shown, the screen sections are mounted on leaf springs M fastened about the middle of the spring to cross bars N pivoted to the end walls P of the casing and carrying two or more leaf springs according to the number required for the length of the screen section, which springs are thus supported near their middles and free at their ends to act elastically to support the screen frame, and yield to permit it to assume its proper position. As shown, a rectangular screen carrier $n^2$ is fixed to the lower end of each spring M and thereby supported and positioned, and rests loosely on the upper ends of the springs, and the screen frame $o^2$ sits loosely in this carrier into which it is dropped from above, and in which it is sufficiently free for its expansion rods $p^2$ and stretching springs $q^2$ to expand it to keep its screen clothing taut.

At the lower end of each screen and extending from it downwardly and then forwardly above the succeeding screen, I provide a re-feeding tray $N^2$ which covers the rear side of the deflecting passage K and the bottom of the re-feeding passage L and feeds the material discharged from an upper section onto the top of the next lower screen and prevents any coarse material entering the fine chamber under the screens. The tray $N^2$ is preferably movably or yieldingly engaged by the upper section and acts against the top of the screen frame of the next lower section to permit relative movement of the two sections, and to hold the upper edge of the screen in its carrier, the lower edge of each being preferably loose.

To jar the screens, I prefer to provide a single impact member for the adjacent parts of two succeeding screens, which is preferably a bar or post Q having a foot or projection $s$ above and acting against the lower edge of an upper screen, and a foot or projection $t$ above and acting downwardly against the upper edge of the adjacent lower screen, which bar preferably has a shoulder or stop $u$ seating against the lower edge of the dam J for limiting upward movement of the post and positioning it. The post Q is movably and preferably slidingly mounted on the upper face of the dam J so that it can move downwardly toward the screen sections, which are pressed firmly up against it by the springs M, which will move and yield to permit each screen to position itself firmly but elastically against the adjacent foot of the post. In this way the post positions the adjacent parts of each screen, and each screen frame positions itself accordingly because of the ability of the supporting springs M to adapt themselves to the positions of the posts.

In order that the inclination of the screen sections may be varied, I prefer to make the posts Q adjustable, as for example by mounting a screw $v$ in each foot, so that by adjusting these screws the position of the screen relatively to the post can be shifted to give the desired inclination, but any other suitable means for changing this inclination either by means of the impact post or otherwise can be employed.

As many impact posts as desired will be used. Each is preferably mounted in a slideway R, to which it is separably connected, as by a through-pin for example, so that it can be readily removed.

For jarring the screen frames, I prefer to apply hammer blows to the upper end of the parts by means of swinging strikers or hammers S, which are shown as hinged to the cover H and operated by cams T mounted on the shaft $w$ of the jarring mechanism, these being so arranged that if the shaft is rotated in either direction the hammers will be lifted or dropped and thus caused to strike on the impact posts and cause these to descend against the adjacent pair of screens, depressing these more or less against their supporting springs under the momentary shock of the blow, after which these springs will restore the parts, moving the impact bars upwardly until their shoulders are arrested by the dam, which will stop this upward movement with an upward jolt or jar, which of itself will have a vibratory effect on the screen clothing.

To protect the fine screens from coarse material, my invention provides a narrow scalping screen U above the screens and between the feeder and the uppermost fine screen section. This is preferably disposed just beneath the feed plate $k$, spaced above the uppermost screen section $C^1$, and narrower than and of slightly less inclination than the latter, and is supported from the screen carrier thereof, so that it participates in the vibration of this. As shown, it is carried in a pivotally or movably mounted screen frame $x$ supported at its ends from the uppermost screen carrier $n^2$ and hinged to the top of the screen casing, so that it can be swung up to facilitate removal of the upper screen frame. This guard screen is narrower than the upper section, and from it lead a number of tailings trays V, W and X, which rest on the top of the dams J and guide the tailings to the tailings outlet Z and prevent falling on the fine screens. The trays or chutes converge to clear the impact posts and to expose the screens for access and inspection.

A pulley $y$ on the shaft $w$ is preferably belt driven from a pulley $z$ on the main shaft for revolving the cams T, and these shafts and the feeder are reversible, as is also the hopper $g$, so that the pulleys can be placed at either end, the feed can be at either end, and the drive can be in either direction.

In operation, the material coming from the feeder will flow down the scalper, which will extract the large pieces and permit the rest to fall onto the fine screens, down which it will flow with accerelating speed until arrested and diverted by the dams, which will check it and make it necessary for it to again start down the next section. In this way undue acceleration of speed of flow will be prevented.

The screens will be vibrated by the impact members, each screen will be positioned against the adjacent parts by the springs, and all will be affected by the jarring action.

The inclination of the screens will be adjusted independently of the casing, and the inclination of the bottom door of the casing will facilitate outflow of fine screenings.

It will be seen that my invention provides improvements which can be readily and advantageously availed of in whole or in part, and it will be understood that the invention is not limited to the particular details of construction, arrangement and combination of parts, nor to the particular adaptation or use set forth as constituting its preferred form, since it can be employed in whole or in part as thus far described according to such modifications as circumstances or the judgment of those skilled in the art may dictate, without departing from the spirit of the invention, for any screening operation in which it is desired that the several fine screens shall give common product, in which case the material passing each flows down the back wall G and is merged and escapes through the lower fine outlet E. In such case the separator produces three products when the head B is mounted directly on the casing as shown, these being the fine product from the outlet E, the coarse product from the outlet Z, and the intermediate size from the outlet F.

My invention comprises, however, grading the product of the fine screens to produce a multiplicity of fine products and eliminate certain finenesses from each, and this is preferably accomplished by provisions for isolating one or more fine screens from the others, so that the product of either can be separately collected, and by making the fine screens of the desired different meshes to accomplish the desired results. This may be accomplished in many ways but preferably I prefer individual outlets O and $O^1$ in the back wall G beneath the adjacent fine screen, and a shunting switch or valve $f$ and $f^1$ for each, and I construct the uppermost screen $C^1$ of the finest mesh to be extracted, the succeeding screen $C^2$ of a coarser mesh, suited to intermediate product, and the lower section C of a still coarser mesh adapted to its product. The valves $f$ may be turned down to close their outlets and combine the products of two or more adjacent screens, and each screen may be adjusted by the screw $v$ to give the desired product.

In operation for multiple separation the top screen $C^1$ will extract the finest material, the next screen $C^2$ the next coarser grade, and so on, the screens being relatively proportioned to suit requirements, and their number being added to according to the number of products desired.

My invention comprises an improved hammer poising spring $r$ which is mounted under the fulcrum of the hammer S and impels the latter toward the striking position with one end and holds it off from the post Q with the other end to poise it in a passive position as shown in Fig. 2.

When the cover H is hinged at the top as shown at $q$ the posts and vibrating mechanism and the dams also if desired as shown, may all be mounted on the cover to swing upwardly therewith and expose the fine screens freely for removal or cleaning. In the construction shown the door when swung upwardly will carry with it the parts suspended from the cover.

What I claim is:

1. In combination, an inclined screen, impact members acting toward it at remote points, a revolving part intermediate of said members, strikers for said impact members operated by said revolving part, a spring or springs poising said strikers positively in an intermediate position and impelling them toward said screen, and means operated by said revolving part operating said strikers in either direction of rotation.

2. In combination, an inclined screen, impact members acting toward it near its upper and lower parts, swinging strikers for said impact members pivotally mounted at separated points intermediate of said members, having striking ends outwardly of said points and working ends adjacent to each other intermediate of said points and a revolving part acting on the working ends of and opposite both of said strikers and mounted intermediate of the pivotal mountings thereof.

3. In combination, an inclined screen, impact members acting toward it at remote points, swinging strikers outwardly of and acting on said impact members and pivotally mounted at separated points intermediate thereof, having striking ends outwardly of said points and working ends adjacent to each other intermediate of said points and a revolving part mounted outwardly of and above and opposite both of the working ends of said strikers intermediate of the pivotal mountings thereof and operating the latter.

4. In combination, two or more resiliently mounted removably inclined screens of substantially identical inclination disposed one above another in different planes, in succession and having their adjacent edges spaced apart, and jarring mechanism for said screens acting on the adjacent parts of two thereof and adjustable toward one of said screens.

5. In combination, two or more resiliently mounted removable inclined screens disposed in different planes in succession one above another, a jarring mechanism acting on adjacent parts of two of said screens and adjustably toward said screens respectively to adapt it to both.

6. In combination, two or more similarly inclined screens disposed in succession and spaced apart one above another in operative relation, and adjustable jarring mechanism acting on and adjustable toward adjacent edges of two of said screens for jarring adjacent parts of two of said screens.

7. In combination, two or more similarly inclined resiliently mounted removable screens disposed one above another in different planes, in succession with the upper edge of one spaced in the direction of their inclination and below and succeeding the lower edge of another, and means for relatively adjusting the inclination of said screens.

8. In combination, two or more similarly inclined screens spaced in the direction of their inclination and arranged one above another in different planes and relatively movable, means for relatively adjusting the inclination of said screens, and means for preventing leakage between said screens.

9. In combination, two or more inclined screens mounted to swing relatively to one another and disposed one above another, and a jarring device adjustable toward said screen acting simultaneously on adjacent parts of two of said screens.

10. In combination, two or more resiliently mounted inclined relatively adjustable screens disposed in different planes one above another, and a movably mounted intercepting plate or member below and spaced apart from an upper one of said screens for arresting material flowing over the latter, and adjustable jarring mechanism above and adjustable toward said screens.

11. In combination, two or more vibratory inclined screens disposed in succession one above another, a frame or casing on which said screens are resiliently mounted having an inclined top or cover above two of said screens, swingingly mounted and extending across adjacent edges of said screens, an intercepting plate or member mounted on said top or cover and spaced below said top or cover to afford a passage above it below and spaced apart from an upper one of said screens for arresting material flowing over the latter and directing it toward a succeeding one of said screens, and jarring means above said top or cover.

12. In combination, two or more resiliently mounted similarly inclined screens arranged in succession one above another in different planes, frame or casing on which said screens are resiliently mounted having a movable inclined top or cover above two of said screens and extending across adjacent edges of said screens, a plate or member of approximately the same inclination as a lower one of said screens mounted below the adjacent upper screen for receiving material passing over the latter and feeding it to the next lower screen, and an interceptor or dam mounted on said top or cover and below and spaced apart from an upper one of said screens, and above and spaced apart from said plate or member for intercepting material flowing over an upper screen and directing it towards said plate or member and affording a space above it for passage of material.

13. In combination, two or more successive similarly inclined screens arranged one above another in different planes, means on which the edges of said screens are resiliently mounted, jarring mechanism above said successive screens for jarring said screens, and a coarse screen above and sustained by and movable with and similarly inclined to one of said screens for delivering screened material to and passing coarser material over said screen.

14. In combination, two or more similarly inclined screens arranged in different planes and one below another, a multi-footed impact member engaging adjacent parts of two succeeding screens, means for adjusting one of the feet of said members, and jarring mechanism acting on said member.

15. In combination, three or more similarly inclined screens disposed in different planes and successively one above another, impact members for adjacent parts of adjacent screens, a jarring mechanism opposite and intermediate one of said screens for acting on the impact members of it and the adjacent screens, and means between said screens and mechanism for keeping coarse material from said screens.

16. In combination, an inclined screen, a scalping screen above and of less length than the latter and swingingly mounted thereover, means for vibrating said inclined screen below said scalping screen, and means for removing the tailings from said scalping screen intermediate of said vibrating means.

17. In combination, a casing affording a screening chamber and having a movable cover, two similarly inclined resiliently mounted successive screens therein both disposed opposite and beneath said top or cover and disposed in different planes one below the other, and a dam below and spaced apart from the lower edge of the uppermost of said screens and above and spaced apart from the upper face of the next of said screens mounted on and spaced below said cover and movable therewith.

18. In combination, a casing affording a downwardly inclined tubular screening chamber, three resiliently mounted removable inclined screens therein, disposed in sections in different planes one below another and of less inclination than the inclination of the bottom of said casing, means mounted on said casing below and spaced apart from the top thereof and below and spaced apart from the lower edge of an upper one of said screens and above and spaced apart from the upper face of a succeeding one of said screens for intercepting or retarding material flowing over said screens, a relatively coarse screen above the uppermost of said screens, means affording a passage for material extracted by said relatively coarse screen through said casing above said retarding means, and a movable cover for said casing above said passage, and on which said passage means are mounted.

19. In combination, an inclined screen, means above said screen for supplying material to be screened to said screen, means above said screen for jarring it, and means above said screen and out of line with and affording a space for said jarring means affording a tubular conduit spaced from said jarring means for conducting unscreened material above said screen from said supplying means to in front of the lower edge of said screen.

20. In combination, an inclined screen, a casing affording a screening chamber and comprising a movable inclined top or cover, an inclined screen mounted in said chamber, means above said screen for supplying material to be screened thereto, spaced means above said screen for jarring it, and means above said screen and mounted on and movable with said top or cover affording a tubular conduit intermediate of and spaced from and out of line with and affording a clearance for said jarring means communicating between said supplying means and in front of the lower edge of said screen for conducting unscreened material above and out of contact with said screen.

In witness whereof, I have hereunto signed my name in the presence of two subscribing witnesses.

GEORGE HOLT FRASER.

Witnesses:
JOSEPH P. TIGHE,
ANTONIO BUONO.